(12) United States Patent
Nishihara et al.

(10) Patent No.: US 8,587,533 B2
(45) Date of Patent: Nov. 19, 2013

(54) TOUCH PANEL AND DISPLAY DEVICE INCLUDING THE SAME

(75) Inventors: Kiyoshi Nishihara, Chiba (JP); Yoshiaki Fujino, Chiba (JP); Koji Toriumi, Chiba (JP)

(73) Assignee: Seiko Instruments Inc. (JP)

( * ) Notice: Subject to any disclaimer, the term of this patent is extended or adjusted under 35 U.S.C. 154(b) by 781 days.

(21) Appl. No.: 12/658,827

(22) Filed: Feb. 16, 2010

(65) Prior Publication Data

US 2010/0220071 A1    Sep. 2, 2010

(30) Foreign Application Priority Data

Feb. 20, 2009  (JP) .................................. 2009-038150
Jan. 7, 2010   (JP) .................................. 2010-002361

(51) Int. Cl.
   *G06F 3/041*   (2006.01)
(52) U.S. Cl.
   USPC .......................................... 345/173; 345/174
(58) Field of Classification Search
   USPC ............. 345/156–184, 104; 178/18.01–20.04
   See application file for complete search history.

(56) References Cited

U.S. PATENT DOCUMENTS

| 8,274,488 B2* | 9/2012 | Bae ................................ 345/173 |
| 2005/0280639 A1* | 12/2005 | Taylor et al. .................. 345/174 |
| 2007/0273560 A1 | 11/2007 | Hua et al. ......................... 341/33 |
| 2008/0024461 A1* | 1/2008 | Richter et al. ................. 345/173 |
| 2008/0180407 A1* | 7/2008 | Utsunomiya et al. ......... 345/174 |
| 2012/0120011 A1* | 5/2012 | Teng et al. ..................... 345/173 |

FOREIGN PATENT DOCUMENTS

| JP | 07064720 | 3/1995 |
| JP | 2005209868 | 8/2005 |

OTHER PUBLICATIONS

Partial English translation of Notification of Rejection mailed Jun. 11, 2013 issued in Japanese Appln. No. JP2010-002361.

* cited by examiner

*Primary Examiner* — Amare Mengistu
*Assistant Examiner* — Jennifer Zubajlo
(74) *Attorney, Agent, or Firm* — Adams & Wilks

(57) ABSTRACT

A touch panel has a substrate with a front surface, a detection region provided on the front surface, and a wiring region provided on the front surface outside the detection region. Detection electrodes are formed in the detection region and are electrically insulated from one another. Wiring electrodes are formed in the wiring region and are electrically connected to the detection electrodes for transmitting a detection signal. A shield electrode is formed on an outer periphery of the front surface of the substrate for shielding the detection electrodes and the wiring electrodes against external noise.

3 Claims, 6 Drawing Sheets

TOUCH PANEL AND DISPLAY DEVICE INCLUDING THE SAME

BACKGROUND OF THE INVENTION

1. Field of the Invention

The present invention relates to a capacitive touch panel and a display device with a touch panel having the touch panel mounted thereon.

2. Description of the Related Art

In recent years, a display device with a touch panel, in which a display input device, such as a cellular telephone, a ticket vending machine, or a hand-held game machine, is combined with a touch panel, has widely been put into practical use. In the display device with a touch panel, a button to touch is displayed on the display device. When a portion indicated by the button is pressed by a finger, a pen, or the like, the pressing is detected and corresponding information is input. Based on the input information, image displayed by the display device is switched, and the next input or other kind of operation is carried out. In the display device with a touch panel, a touch sensor is integrally formed on a display screen of the display device, which saves space. Further, the position and function of an input button may be freely changed, which enhances the operability of the device.

FIG. 11 schematically illustrates a structure of a conventional capacitive touch sensor (see, for example, US 2007/0273560 A1). A plurality of black rhombic detection electrodes 503 and a plurality of outline rhombic detection electrodes 501 are formed on a surface of a flat substrate. The black rhombic detection electrodes 503 are connected to row electrodes 504 while the outline rhombic detection electrodes 501 are connected to column electrodes 505. The row electrodes 504 and the column electrodes 505 are connected to a processing device 210 via wiring 502. When a conductive object 303 approaches the surface, capacitances of a row electrode 504 and a column electrode 505 approached by the conductive object are changed. The changes in capacitance are detected by the processing device 210, and the row and column approached by the conductive object 303 are determined. In this way, the position of the conductive object 303 is determined.

In the capacitive touch sensor, the position of a conductive object such as a finger or a pen may be determined even when the conductive object does not touch or only lightly touches the surface of the substrate having sensor elements formed thereon, and hence a high degree of operability is realized. Further, the capacitive touch sensor may be formed using only one substrate, and hence the capacitive touch sensor may be formed thinner and more lightweight as compared with a resistive touch sensor. Further, even when an insulator such as a cover glass is provided on the surface to be touched, input may be carried out from above the insulator, and hence design flexibility may be enhanced.

FIG. 12 is a schematic longitudinal sectional view of an example of a display device 60 with a touch panel, in which a touch panel 63 is provided on a display panel 64. The touch panel 63 is provided on an upper surface of the display panel 64 while a drive circuit 65 is provided on a rear surface side of the display panel 64. A cover glass 61 is provided on an upper surface of the touch panel 63. An edge cover 62 for covering edges of the display is formed on an outer periphery of the cover glass 61. The touch panel 63, the display panel 64, and the drive circuit 65 are housed in a housing 66 made of a conductor.

In a capacitive touch panel, when a conductor approaches a detection electrode, capacitance between the conductor and the detection electrode changes. By detecting weak current caused by the changed capacitance, the position of the conductor is determined. However, a capacitive touch panel has a problem that electromagnetic noise and static electricity which come around from the upper surface of the substrate except for a detection region or from an edge portion of the substrate are input to a detection electrode or a wiring electrode, leading to erroneous determination. For example, as illustrated in FIG. 12, electromagnetic noise Z1 makes an entry through a small gap between the cover glass 61 and the housing 66. Further, an electromagnetic wave generated from the display panel 64 or the drive circuit 65 may also enter as electromagnetic noise Z2 to be applied to a wiring electrode or a detection electrode of the touch panel 63, leading to erroneous determination.

SUMMARY OF THE INVENTION

In view of the above-mentioned circumstances, an object of the present invention is to provide a touch panel and a display device with a touch panel which is less liable to malfunction even in an environment in which electromagnetic noise or static electricity exists.

According to an aspect of the present invention, there is provided a touch panel, in which a detection region is provided on a front surface of a substrate, and a wiring region is provided outside the detection region. In the detection region, a plurality of detection electrodes for detecting the presence of a conductor are formed, and the plurality of detection electrodes are electrically insulated from one another. In the wiring region, wiring electrodes for transmitting a detection signal are formed, and the wiring electrodes are electrically connected to the detection electrodes. A first shield electrode for shielding against noise from outside is formed on an outer periphery of the substrate.

A first insulating layer may be provided on the wiring electrodes and the first shield electrode.

Further, a second shield electrode may be provided on an upper surface of the first insulating layer so as to cover the wiring region and the first shield electrode. Here, the first shield electrode and the second shield electrode are electrically connected to each other via a first through hole formed in the first insulating layer.

A metal frame may be provided on an outer periphery of sides of the substrate and over the wiring region.

A third shield electrode may be formed on a rear surface of the substrate.

Further, a second insulating layer may be formed on a lower surface of the third shield electrode.

A fourth shield electrode may be formed on a lower surface of the second insulating layer so as to correspond to the wiring region and the first shield electrode, and the fourth shield electrode may be electrically connected to the third shield electrode via a second through hole formed in the second insulating layer.

According to another aspect of the present invention, there is provided a display device with a touch panel, which includes a touch panel and a display panel provided on a rear surface of the touch panel. The touch panel includes a substrate having a detection region provided on a front surface thereof. In the detection region, a plurality of detection electrodes for detecting the presence of a conductor are formed, and the plurality of detection electrodes are electrically insulated from one another. A wiring region is provided outside the detection region. In the wiring region, wiring electrodes for transmitting a detection signal are formed, and the wiring electrodes are electrically connected to the detection electrodes. A first shield electrode for shielding against noise from outside is formed on an outer periphery of the substrate.

Further, a second shield electrode may be provided so as to cover the writing region and the first shield electrode, a third shield electrode, which is translucent, may be provided on an upper surface of the display panel, and a forth shield electrode electrically connected to the third shield electrode may be formed on an outer periphery of the rear surface of the touch panel.

According to the present invention, there is obtained a touch panel capable of shielding against noise entering through a surface of the substrate of the touch panel, and hence erroneous determination due to a malfunction may be reduced.

DETAILED DESCRIPTION OF THE PREFERRED EMBODIMENTS

Figure 1A:
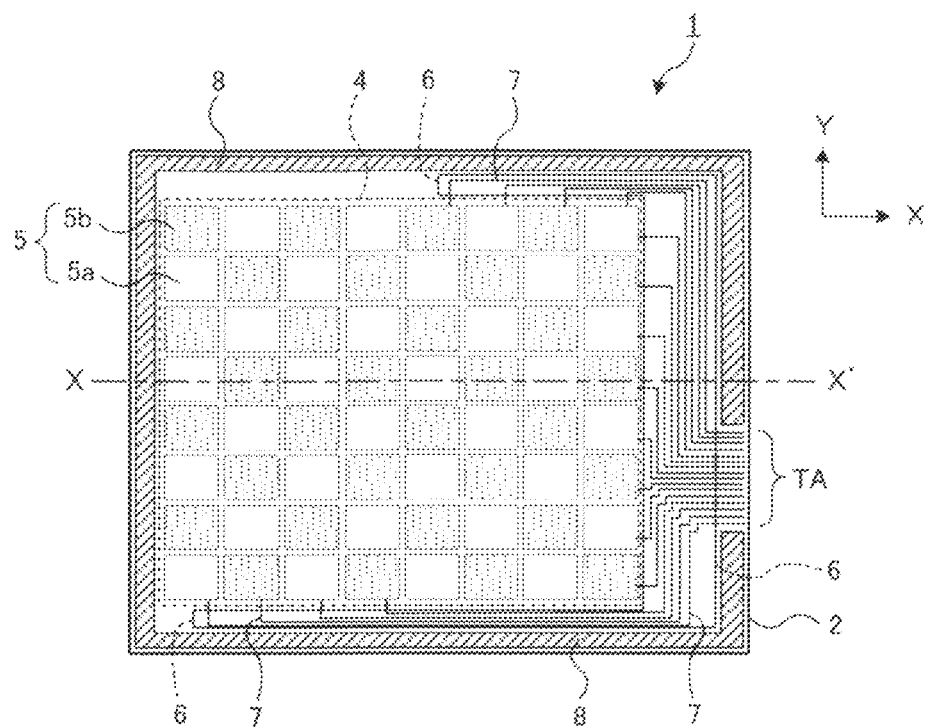
FIGS. 1A and 1B are schematic views for illustrating a basic structure of a touch panel according to the present invention.

In a touch panel according to the present invention, a detection region is provided on a front surface of a substrate, and a wiring region is provided outside the detection region. A plurality of detection electrodes for detecting the presence of a conductor are formed in the detection region: Wiring electrodes for transmitting a detection signal are formed in the wiring region. Further, a first shield electrode for shielding against noise from outside is formed outside these two regions, that is, on an outer periphery of the substrate. When other terminals and elements are arranged at an edge portion of the substrate, the first shield electrode may be formed only at a portion in which no such terminals and elements are formed. However, although the first shield electrode may be formed as being partially chipped as described above, the first shield electrode is formed on approximately 70% or more of the whole outer periphery of the substrate.

Further, a first insulating layer may be provided on the wiring electrodes and the first shield electrode.

Further, a second shield electrode may be formed on an upper surface of the first insulating layer so as to cover the wiring region and the first shield electrode. In this case, a first through hole is formed in the first insulating layer, and the second shield electrode is electrically connected to the first shield electrode via the first through hole.

Further, a third shield electrode maybe formed on a rear surface of the substrate, and a second insulating layer may be formed on a lower surface of the third shield electrode. Further, a fourth shield electrode may be formed on a lower surface side of the second insulating layer so as to correspond to the wiring region and the first shield electrode, and the third shield electrode and the fourth shield electrode may be electrically connected to each other via a second through hole provided in the second insulating layer. With this configuration, shielding may be carried out against electromagnetic noise, static electricity, and the like entering through the rear surface of the substrate.

Further, a display device may be provided on a rear surface of the touch panel. In this case, shielding may be carried out against electromagnetic noise generated from a display surface of the display device.

A display device with a touch panel according to the present invention includes a touch panel and a display panel provided on a rear surface of the touch panel. The touch panel includes a detection region on a front surface thereof and a wiring region provided outside the detection region. A plurality of detection electrodes electrically insulated from one another are formed in the detection region of the touch panel. Wiring electrodes electrically connected to the detection electrodes are formed in the wiring region, and the wiring electrodes transmit a detection signal. Further, a first shield electrode is formed outside a region including the detection region and the wiring region, that is, on an outer periphery of the substrate. The first shield electrode carries out shielding against noise from outside.

Alternatively, a display panel may be provided on a rear surface of any of the touch panels described above.

Further, a fifth shield electrode, which is translucent, may be formed on an upper surface of the display panel, a sixth shield electrode may be formed on an outer periphery of the rear surface of the touch panel, and the fifth shield electrode and the sixth shield electrode may be electrically connected to each other.

Next, a basic structure of a touch panel 1 according to the present invention is described with reference to FIGS. 1A and 1B.

Figure 1B:
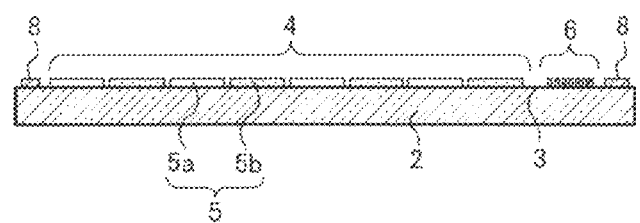

FIG. 1A is a schematic top plan view of the touch panel 1, and FIG. 1B is a schematic longitudinal sectional view taken along the line X-X' of FIG. 1A.

A plurality of detection electrodes 5 and wiring electrodes 7 are formed on a front surface 3 of a substrate 2 of the touch panel 1. The plurality of detection electrodes 5 detect the approach of a conductor. The wiring electrodes 7 are electrically connected to the detection electrodes 5, and transmit a detection signal to an external circuit. Further, a first shield electrode 8 for shielding against noise from outside is formed outside a region including the detection electrodes 5 and the wiring electrodes 7, that is, on an outer periphery of the substrate 2. The plurality of detection electrodes 5 are formed in a center portion of the substrate 2, to thereby form a detection region 4. The wiring electrodes 7 connected to the plurality of detection electrodes 5 are formed concentratedly outside the detection region 4, to thereby form a wiring region 6. The first shield electrode 8 is formed outside a region including the detection region 4 and the wiring region 6 so as to surround the detection region 4 and the wiring region 6. With this configuration, the first shield electrode 8 shields against noise entering from an edge portion of the substrate 2 before the noise reaches the wiring electrodes 7 or the detection electrodes 5.

Here, the wiring electrodes 7 are concentrated in a right edge portion of the substrate 2, to thereby form a terminal portion TA. The first shield electrode 8 is formed up to places in proximity to the terminal portion TA. Although not shown, a flexible substrate is connected to the terminal portion TA and the wiring electrodes 7 are connected to the external circuit. The first shield electrode 8 is connected to GND (not shown) via the flexible substrate. Alternatively, the first shield electrode 8 may be brought into contact with a metal case for housing the touch panel 1 or the like so as to be connected to GND.

As the substrate 2, a glass substrate or a plastic substrate may be used. As the detection electrodes 5, a transparent conductive film obtained by depositing indium tin oxide (ITO), tin oxide, zinc oxide, a conductive polymer, or the like may be used. As the wiring electrodes 7, a transparent conductive film or a metal film may be used. The detection system is a coordinate detection system in which the detection electrodes 5 are arranged in an X-Y matrix. Outline detection electrodes 5a are connected in a row direction (X direction) while gray detection electrodes 5b are connected in a column direction (Y direction). It should be noted that the detection system is not limited to the coordinate detection system in the X-Y matrix, and may be a fixed pattern system (button switch system) in which the detection electrodes 5 are formed in necessary locations in the detection region 4. The wiring electrodes 7 may be formed of a transparent conductive film or a metal film. The first shield electrode 8 may be formed by depositing a metal film on the front surface 3 of the substrate 2 by sputtering or vapor deposition and then carrying out patterning. Further, the first shield electrode 8 may be formed of a conductive seal having an adherent material or an adhesive material provided on a rear surface thereof and a metal film provided on a front surface thereof, which may be attached to the outside of the detection region 4 and the wiring region 6, that is, on an outer periphery of the substrate.

It should be noted that, in the present invention, the outer periphery of the substrate does not necessarily refer to the whole outer periphery of the substrate, which may simply refer to the outside of the region including the detection region 4 and the wiring region 6. When other terminals and elements such as the terminal portion TA connected to the external circuit and a chip on glass package are mounted on an edge portion of the substrate 2 as illustrated in FIG. 1A, the outer periphery may not include a portion in which such terminals and elements are formed. As a guide, the outer periphery accounts for approximately 70% or more of the whole outer periphery of the substrate 2. Further, the first shield electrode 8 is formed on the outer periphery.

(Embodiment 1)

Figure 2A:
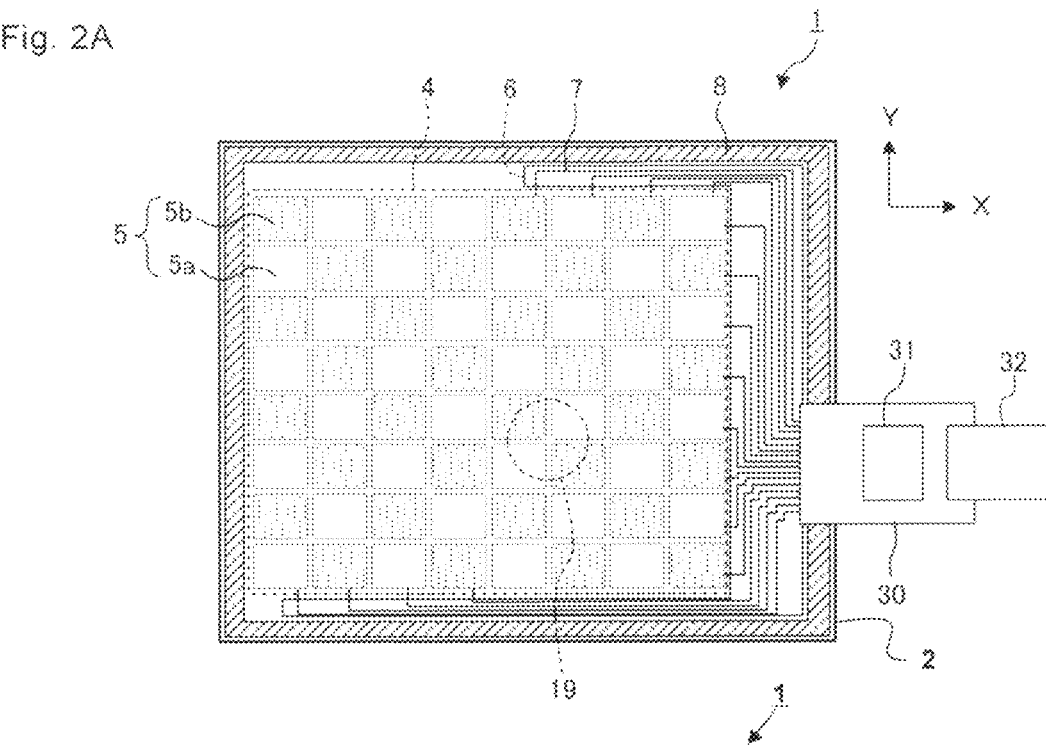
FIGS. 2A and 2B are schematic top plan views of touch panels according to an embodiment of the present invention.
Figure 2B:
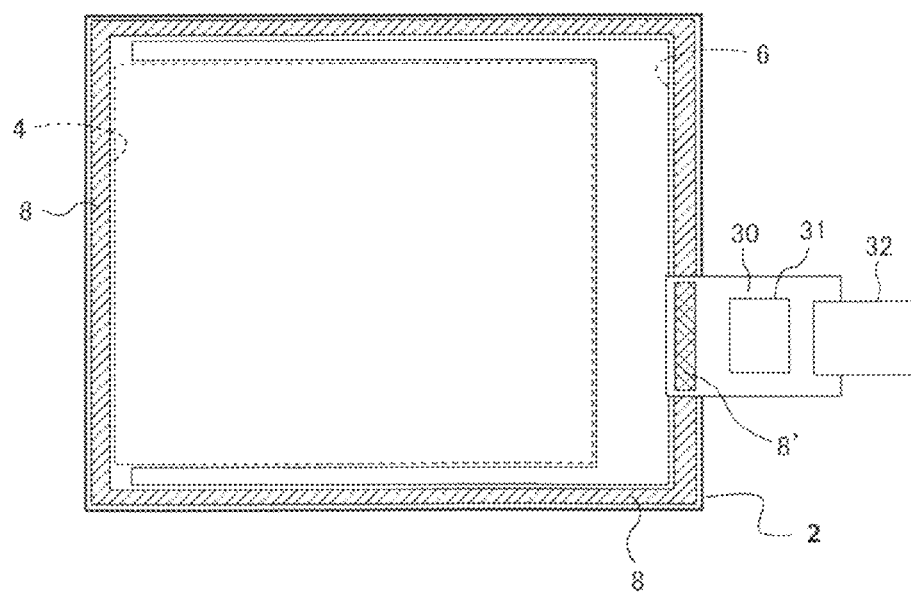

FIGS. 2A and 2B are schematic top plan views of touch panels 1 according to this embodiment. FIG. 2A illustrates the touch panel 1 having a first flexible substrate 30 bonded thereto, the first flexible substrate 30 having a signal processing IC 31 mounted thereon. FIG. 2B illustrates the touch panel 1 which additionally includes a first shield electrode 8' formed on an upper surface of the first flexible substrate 30.

As illustrated in FIG. 2A, the plurality of detection electrodes 5 forming the detection region 4, the plurality of wiring electrodes 7 forming the wiring region 6, and the first shield electrode 8 surrounding the region which includes the detection region 4 and the wiring region 6, are formed on the front surface of the substrate 2 of the touch panel 1. The structure is similar to that of the touch panel 1 illustrated in FIG. 1A. Further, one end of the first flexible substrate 30 is connected to the terminal portion TA. The signal processing IC 31 is mounted on the first flexible substrate 30 and a second flexible substrate 32 is connected to another end of the first flexible substrate 30. The second flexible substrate 32 is connected to a control portion (not shown).

The plurality of detection electrodes 5 are arranged in the X-Y matrix. The outline detection electrodes 5a formed in a line in an X direction are electrically connected to one another and are connected to the wiring electrodes 7 on the right side. The gray detection electrodes 5b formed in a line in a Y direction are electrically connected to one another and are connected to the wiring electrodes 7 on the lower side or on the upper side. The first shield electrode 8 is formed on the outer periphery of the substrate 2. Here, the outer periphery does not have to correspond to the whole outer periphery of the substrate 2 insofar as the outer periphery falls outside the region including the detection region 4 and the wiring region 6. More specifically, the first shield electrode 8 is formed from an upper end portion of the first flexible substrate 30 on the right side of the substrate 2 through the upper side, the left side, and the lower side of the substrate 2, so as to come around to a lower end portion of the first flexible substrate 30. A plurality of electrodes for connection are formed on a lower surface of the first flexible substrate 30 and are connected to the wiring electrodes 7 of the terminal portion TA. The first shield electrode 8 is connected to a GND terminal (not shown) of the first flexible substrate 30 at its end portions on the right side. Therefore, the region including the detection region 4 and the wiring region 6, except the region in which the first flexible substrate 30 is connected, is surrounded by the first shield electrode 8. With this configuration, the first shield electrode 8 shields against noise and static electricity entering from an edge portion of the substrate 2.

The plurality of detection electrodes 5 are formed by depositing ITO on the substrate 2 by sputtering or vapor deposition and by patterning the deposited ITO by photolithography and etching. The wiring electrodes 7 and the first shield electrode 8 are formed by depositing a metal film by sputtering or vapor deposition and by patterning the deposited metal film by photolithography and etching. The detection region 4 is translucent, and accordingly, when a display device is provided under the touch panel 1, an image displayed by the display device may be visually recognized from above the touch panel 1.

Next, position detection is described briefly. When a conductor 19 approaches a specific position in the detection region 4, capacitances of the detection electrodes 5 in the row and the column approached by the conductor 19 are changed. A signal indicating the capacitance change is input via the wiring electrodes 7 to the signal processing IC 31. The signal processing IC 31 determines the row and column in which the capacitance has been changed, and determines the position approached by the conductor 19. It should be noted that, even when a plurality of conductors 19 approach the detection region 4 at the same time, the positions of the plurality of conductors 19 may be determined.

FIG. 2B illustrates another example of this embodiment, in which a first shield electrode 8' is formed above the terminal portion TA of the first flexible substrate 30. Although not shown, similarly to the case illustrated in FIG. 2A, the detection electrodes are formed in the detection region 4 and the wiring electrodes are formed in the wiring region 6. The first shield electrode 8' is electrically connected to the first shield electrode 8 via a through hole (not shown) provided in the first flexible substrate 30 or by being connected to GND. Accordingly, the whole outer periphery of the substrate 2 is surrounded by the first shield electrodes 8 and 8'. As a result, the effect of shielding against electromagnetic noise from outside may be further enhanced.

Figure 3:
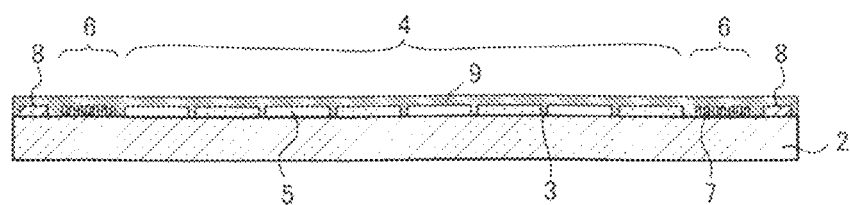
FIG. 3 is a schematic sectional view of another touch panel according to the embodiment of the present invention.

FIG. 3 is a schematic longitudinal sectional view illustrating further another example of this embodiment. The detection electrodes 5, the wiring electrodes 7, and the first shield electrode 8 are formed on the front surface 3 of the substrate 2 similarly to the those illustrated in FIG. 2A, and therefore the description thereof is omitted. As illustrated in FIG. 3, a first insulating layer 9 is formed on the detection electrodes 5, the wiring electrodes 7, and the first shield electrode 8, which are provided on the front surface of the substrate 2. In other words, exposed front surfaces of these electrodes are covered with the first insulating layer 9. The first insulating layer 9 may include a silicon oxide film, a silicon nitride film, or other metal oxide films formed by sputtering or chemical vapor deposition (CVD). The first insulating layer 9 may also be formed by applying or attaching a polymer resin layer. The touch panel 1 is a capacitive touch panel, and accordingly, even when an insulating film is formed on the detection electrodes 5, a conductor which approaches the detection electrode 5 may be detected.

Due to the first insulating layer 9 thus formed, a flaw or disconnection of the detection electrodes 5 may be prevented when the conductor comes in contact with the front surface 3. Further, even when moisture or the like attaches to the front surface 3, electrical connection between the detection electrodes 5 may be prevented and adverse effects on the determined position and the detection sensitivity may be prevented.

Figure 4:
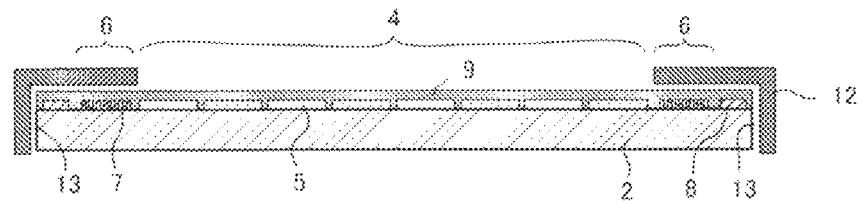
FIG. 4 is a schematic sectional view of further another touch panel according to the embodiment of the present invention.

FIG. 4 is a schematic longitudinal sectional view illustrating still further another example of this embodiment. The detection electrodes 5, the wiring electrodes 7, the first shield electrode 8, and the first insulating layer 9 are formed on the front surface 3 of the substrate 2 similarly to the those illustrated in FIG. 3, and therefore the description thereof is omitted. In the touch panel illustrated in FIG. 4, a metal frame 12 is provided on an outer periphery 13 of sides of the touch panel illustrated in FIG. 3. As the metal frame 12, a housing for housing the touch panel 1 may also be used. The metal frame 12 is extended above the wiring region 6 and covers the wiring region 6 and the first shield electrode 8 with the first insulating layer 9 therebetween. The metal frame 12 is, similarly to the first shield electrode 8, connected to GND (not shown).

As described above, the metal frame 12 covers the edge portions of the substrate 2 and the wiring electrodes 7, to thereby shield against electromagnetic noise and static electricity from outside with more reliability, with the result that a malfunction may be suppressed. Further, the metal frame 12 may be utilized as an edge covering portion which covers the wiring region 6 and the first shield electrode 8 so as not to be made invisible from outside.

(Embodiment 2)

The touch panel 1 according to this embodiment is described with reference to FIGS. 5A and 5B. FIG. 5B is a schematic top plan view of the touch panel 1 and FIG. 5A is a schematic longitudinal sectional view taken along the line Y-Y' of FIG. 5B.

Figure 5A:
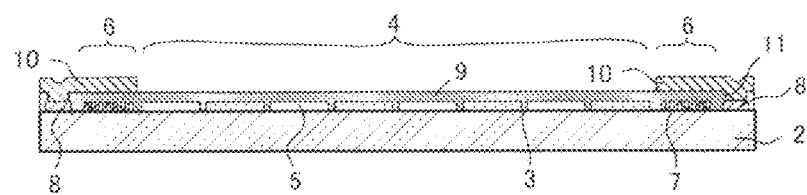
FIGS. 5A and 5B illustrate a touch panel according to another embodiment of the present invention.
Figure 5B:
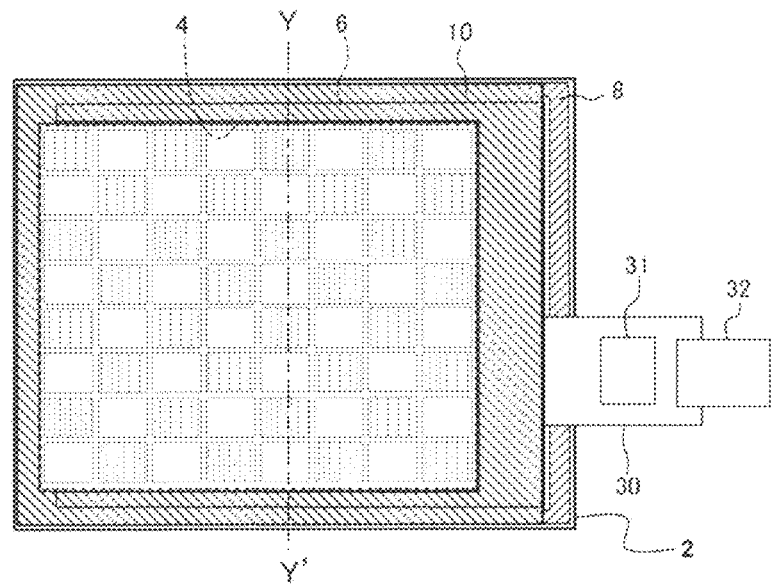

As illustrated in FIG. 5A, the plurality of detection electrodes 5 are formed on the front surface 3 of the substrate 2, to thereby form the detection region 4. The wiring electrodes 7 are formed outside the detection region 4, to thereby form the wiring region 6. Further, the first shield electrode 8 is formed on the outer periphery of the front surface 3 of the substrate 2, that is, outside the region including the detection region 4 and the wiring region 6. The first insulating layer 9 is formed on the detection region 4, the wiring region 6, and the first shield electrode 8. Further, a second shield electrode 10 is formed on the upper surface of the first insulating layer 9 so as to cover the wiring region 6 and the first shield electrode 8. The second shield electrode 10 is electrically connected to the first shield electrode 8 through a first through hole 11 formed in the first insulating layer 9, and further, connected to GND (not shown).

The second shield electrode 10 may be formed by depositing a metal film by sputtering or vapor deposition. In this case, by depositing the metal film with the detection region 4 being masked, the patterning process may be omitted. The second shield electrode 10 may be formed by attaching a conductive tape, the conductive tape having a metal film provided on a front surface thereof and an adherent material or an adhesive material applied on a rear surface thereof.

As illustrated in FIG. 5B, the second shield electrode 10 is formed so as to surround the whole periphery of the detection region 4. The wiring region 6 is surrounded by the first shield electrode 8 formed on the front surface 3 of the substrate 2, and also, by the second shield electrode 10 formed on an upper surface of the first shield electrode 8. With this configuration, the wiring electrodes 7 may be shielded against electromagnetic noise entering from the side and above, to thereby prevent erroneous determination of position detection more effectively.

Figure 6:
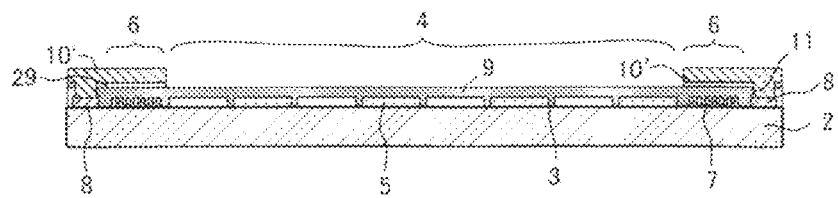
FIG. 6 is a schematic sectional view of another touch panel according to the embodiment of the present invention.

FIG. 6 is a sectional view of another example of this embodiment. In the touch panel illustrated in FIG. 6, an adherent material 29 is provided between a second shield electrode 10' and the first insulating layer 9. Except for this, the structure of the touch panel is similar to that illustrated in FIG. 4, and hence the description thereof is omitted. It should be noted that, in this example, a conductive tape having the adherent material formed on a rear surface side of a metal film is used as the second shield electrode 10'. The second shield electrode 10' is adhered to the first insulating layer 9 with the adherent material 29, and is electrically connected to the first shield electrode 8 via the first through hole 11 provided in the first insulating layer 9.

(Embodiment 3)

Figure 7:
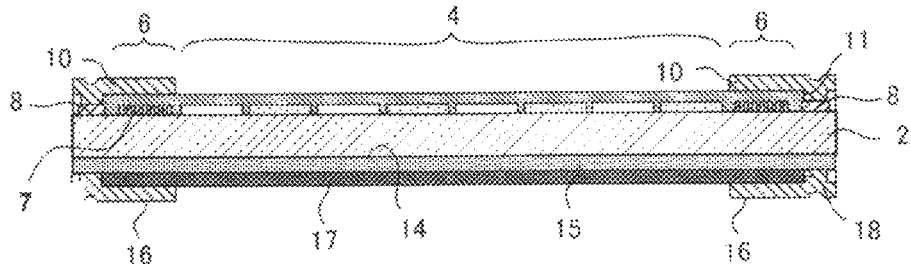
FIG. 7 is a schematic sectional view of a touch panel according to further another embodiment of the present invention.

FIG. 7 is a schematic longitudinal sectional view illustrating the touch panel 1 according to this embodiment. The detection electrodes 5, the wiring electrodes 7, the first shield electrode 8, the first insulating layer 9, and the second shield electrode 10 are formed on the front surface 3 of the substrate 2 similarly to Embodiment 2 illustrated in FIG. 5A, and therefore the description thereof is omitted.

A third shield electrode 15 is formed across an entire surface of a rear surface 14 of the substrate 2. A second insulating layer 17 is formed on a lower surface of the third shield electrode 15. Further, a fourth shield electrode 16 is formed on a lower surface of the second insulating layer 17 so as to cover regions corresponding to the first shield electrode 8 and the wiring region 6. The fourth shield electrode 16 is electrically connected to the third shield electrode 15 via a second through hole 18 formed in the second insulating layer 17. The third shield electrode 15 may include a transparent conductive film formed by depositing ITO, tin oxide, zinc oxide, or the like by sputtering or vapor deposition. Further, the third shield electrode 15 may be formed by applying a conductive polymer. The second insulating layer 17 may be a silicon oxide film or a silicon nitride film formed by sputtering or CVD. Further, instead of sputtering or vapor deposition of an insulating material, a transparent plastic film made of an insulator may be attached. As the fourth shield electrode 16, a metal film may be formed by sputtering or vapor deposition. Instead of depositing the metal film, a conductive sheet having a metal film formed thereon may be attached.

Due to the third shield electrode 15 formed on the whole rear surface 14, shielding may be carried out against electromagnetic noise and static electricity entering from the side of the rear surface 14. In particular, when a display device is provided on the side of the rear surface 14, electromagnetic noise is generated from a display surface of the display device. The third shield electrode 15 is effective in shielding against such noise from the rear surface 14 side. The second insulating layer 17 functions as a surface protective film of the rear surface 14 of the substrate 2 and the third shield electrode 15. The fourth shield electrode 16 is capable of shielding against electromagnetic noise and static electricity entering from an edge portion of the rear surface 14 of the substrate 2.

It should be noted that, in this embodiment, a structure in which the second shield electrode is provided on the upper surface side of the substrate is described, but the present invention is not limited thereto. A touch panel having the structure described in Embodiment 1 may be used and the above-described electrodes, and insulating layer may be provided on the rear surface of the substrate.

(Embodiment 4)

Figure 8:
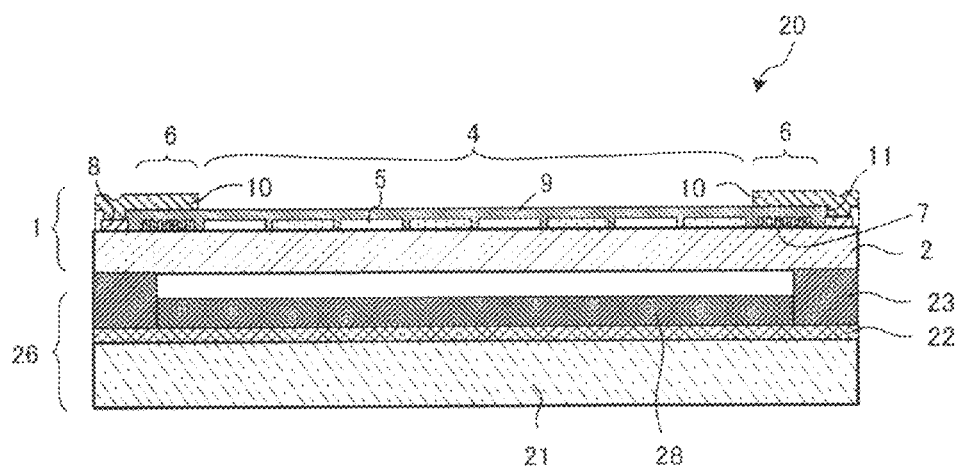
FIG. 8 is a schematic sectional view of a display device with a touch panel according to still further another embodiment of the present invention.

FIG. 8 is a schematic longitudinal sectional view of a display device 20 with a touch panel according to this embodiment. In the display device 20 with a touch panel, the touch panel 1 is provided on a liquid crystal display device 26. In the touch panel 1, the detection region 4 is provided on the front surface of a translucent substrate and the wiring region 6 is provided outside the detection region 4. The detection electrodes 5, which are translucent, are formed in the detection region 4 while the wiring electrodes 7 are formed in the wiring region 6. The wiring electrodes 7 are electrically connected to the detection electrodes 5, and transmit a detection signal. The first shield electrode 8 is formed on the outer periphery of the substrate, that is, outside the region including the detection region 4 and the wiring region 6. The first insulating layer 9, which is transparent, is formed on the detection region 4, the wiring region 6, and the first shield electrode 8. Further, the second shield electrode 10 is formed on the upper surface of the first insulating layer 9 so as to cover the first shield electrode 8 and the wiring region 6. The second shield electrode 10 is electrically connected to the first shield electrode 8 via the first through hole 11 formed in the first insulating layer 9.

Although not shown, the liquid crystal panel 21 includes two glass substrates and a liquid crystal layer sandwiched between the glass substrates. A third shield electrode 22, which is translucent, formed on a front surface of the liquid crystal panel 21, and a polarizing plate 28 is attached on the third shield electrode 22. Although not shown, a lower polarizing plate, a backlight, and the like are disposed on a rear surface of the liquid crystal panel 21. A fourth shield electrode 23 is formed on an outer periphery of the rear surface of the substrate 2. The fourth shield electrode 23 is sandwiched between the liquid crystal display device 26 and the touch panel 1.

Here, the third shield electrode 22 is formed by depositing a translucent conductive film of ITO, tin oxide, zinc oxide, or the like by sputtering or vapor deposition. Further, instead of these translucent conductive films, the third shield electrode 22 may be formed by applying a conductive polymer. As the fourth shield electrode 23, conductive rubber or a metal frame may be used.

According to the structure of this embodiment, the substrate 2, the detection electrodes 5, and the first insulating layer 9 of the touch panel 1 are all translucent, and hence an image displayed by the liquid crystal display device 26 may be visually recognized from above the touch panel 1. Further, due to the third shield electrode 22 formed on the liquid crystal display surface, electromagnetic noise, which is generated from the display surface when the liquid crystal panel 21 is driven, may be prevented from entering the touch panel 1. At the same time, shielding may be carried out against static electricity applied from the display surface side to the liquid crystal layer of the liquid crystal panel 21. Further, the fourth shield electrode 23 may prevent electromagnetic noise and static electricity from entering through a gap between the touch panel 1 and the liquid crystal display device 26.

It should be noted that the liquid crystal display device 26 of this embodiment may include an in-plane switching (hereinafter, referred to as IPS) liquid crystal display device. In an IPS liquid crystal display device, no electrode is formed on the side of a substrate which is opposed to a substrate having a TFT formed thereon. In other words, there is no electrode to serve as a shield. Therefore, when an electric field such as static electricity is applied from the side of the display surface, there arises a problem that liquid crystal molecular orientation is disordered to reduce the display quality. In order to solve the problem, an IPS liquid crystal display device may have a structure in which a translucent electrode layer is provided on a surface of an upper substrate. When an IPS liquid crystal display device having such a structure is used in this embodiment, the fifth shield electrode may be omitted and only a sixth shield electrode has to be provided. Therefore, the number of manufacturing steps may be reduced.

(Embodiment 5)

Figure 9:
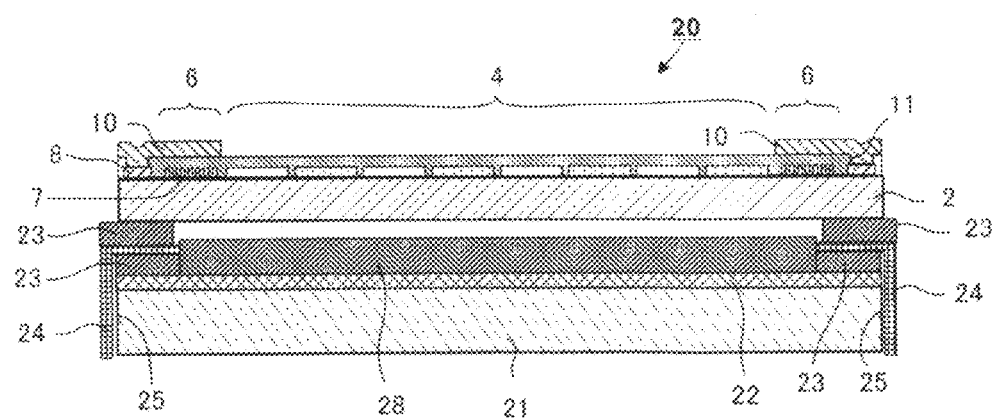
FIG. 9 is a schematic sectional view of a display device with a touch panel according to yet further another embodiment of the present invention.

FIG. 9 is a schematic longitudinal sectional view of the display device 20 with a touch panel according to this embodiment. This embodiment is different from Embodiment 4 in that a conductor 24 is provided on an outer periphery 25 of sides of the liquid crystal panel 21. Except for this point, this embodiment is similar to Embodiment 4, and hence the description thereof is omitted. As illustrated in FIG. 9, the conductor 24 is provided around the sides of the liquid crystal panel 21 and is connected to the fourth shield electrode 23. With this configuration, shielding may be carried out against electromagnetic noise generated sideways from the liquid crystal panel 21, and hence electromagnetic noise may be prevented from coming around to the touch panel 1. Further, static electricity may be prevented from making an entry sideways with respect to the liquid crystal panel 21 to disorder the liquid crystal molecular orientation. The conductor 24 may be formed using a metal frame or a conductive sheet.

Figure 10:
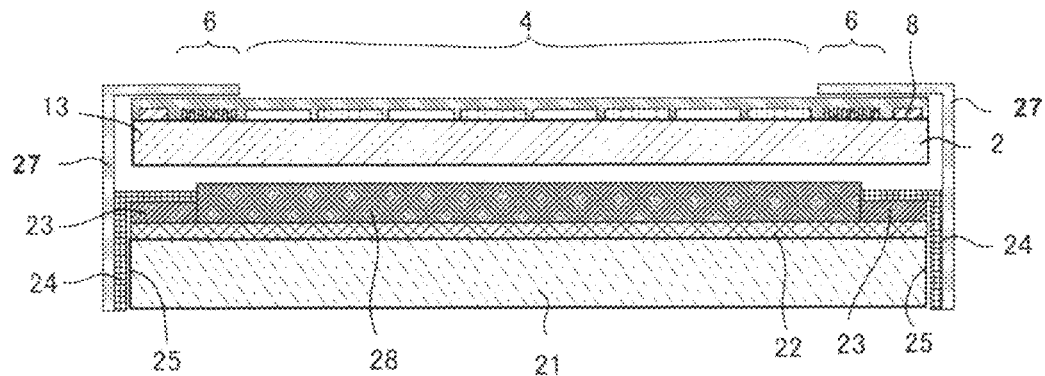
FIG. 10 is a schematic sectional view of another display device with a touch panel according to the embodiment of the present invention.
Figure 11:
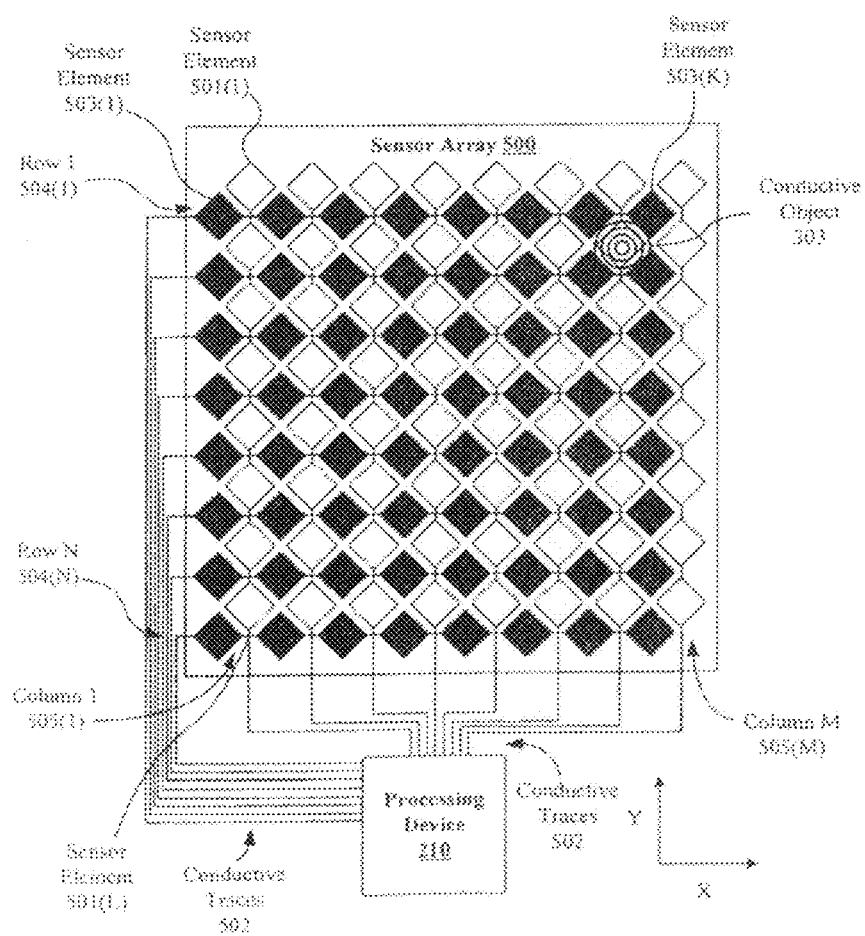
FIG. 11 is a plan view of a conventional touch panel.
Figure 12:
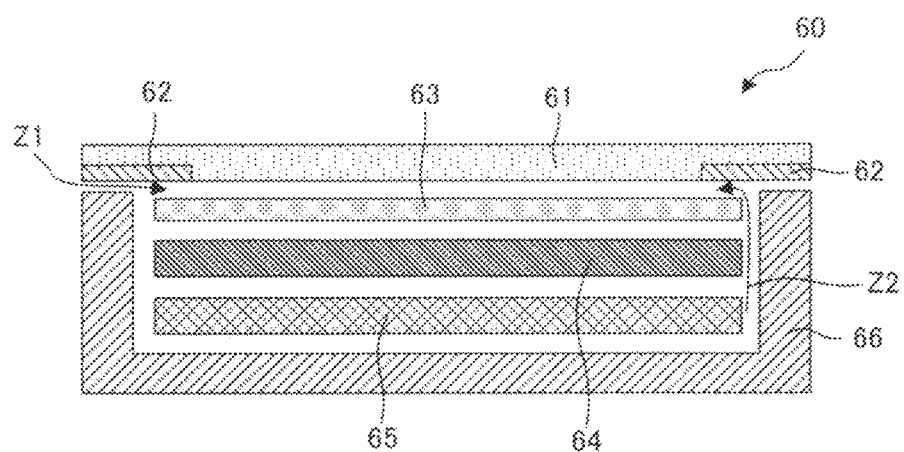
FIG. 12 is a schematic sectional view of a conventional display device with a touch panel.

FIG. 10 is a schematic longitudinal sectional view of another example of the display device 20 with a touch panel of this embodiment. As illustrated in FIG. 10, the detection electrodes 5, the wiring electrodes 7, the first shield electrode 8, and the first insulating layer 9 are formed on the front surface 3 of the substrate 2. In this example, instead of the second shield electrode 10, a metal frame 27 is provided over the first shield electrode 8 and the wiring region 6. The metal frame 27 surrounds the outer periphery 13 of sides of the touch panel, an outer periphery 25 of sides of the liquid crystal display device, and the wiring region 6 on the upper surface of the touch panel. With this configuration, shielding may be carried out against electromagnetic noise and static electricity with more reliability.

It should be noted that, as the structures of the touch panels of Embodiment 4 and Embodiment 5 illustrated in FIGS. 8 to 10, the structures of Embodiment 1 illustrated in FIG. 3, Embodiment 2 illustrated in FIG. 6, and Embodiment 3 illustrated in FIG. 7 may also be employed. Further, although the third shield electrode 22 is formed on the front surface of the liquid crystal panel 21, instead of this, the third shield electrode 22 may be formed on an upper surface of the polarizing plate 28. When a flexible substrate to be connected to the external circuit is provided on the liquid crystal panel 21, the fourth shield electrode 23 and the conductor 24 may be formed only in a region in which the flexible substrate is not provided. However, the fourth shield electrode 23 and the conductor 24 are formed so as to surround approximately 70% or more of the whole outer periphery of the liquid crystal panel 21 or the touch panel 1.

Further, Embodiment 4 and Embodiment 5 illustrated in FIGS. 8 to 10 illustrate cases in which the liquid crystal panel 21 is used as the display panel. However, instead of the liquid crystal panel 21, an electroluminescent (EL) panel, a plasma display panel (PDP), an electrophoresis panel, or any other flat panel may be used.

Further, in the above-described embodiments, the detection electrodes in the detection region 4 are formed as a coordinate detection system in the X-Y matrix, but the present invention is not limited thereto, and the detection electrodes may be of a fixed pattern system (button switch system).

What is claimed is:

1. A touch panel comprising:
   a substrate having a front surface, a detection region provided on the front surface, and a wiring region provided on the front surface outside the detection region;
   a plurality of detection electrodes formed in the detection region and electrically insulated from one another;
   wiring electrodes formed in the wiring region and electrically connected to the plurality of the detection electrodes for transmitting a detection signal;
   a first shield electrode formed on an outer periphery of the front surface of the substrate for shielding the detection electrodes and the wiring electrodes against external noise;
   a first insulating layer formed on the wiring electrodes and the first shield electrode; and
   a second shield electrode formed on an upper surface of the first insulating layer so as to cover the wiring region and the first shield electrode, the first insulating layer having a first through hole formed therein, and the second shield electrode being electrically connected to the first shield electrode via the first through hole.

2. A display device with a touch panel, comprising:
   a substrate having a front surface and a rear surface, a detection region provided on the front surface, and a wiring region provided on the front surface outside the detection region;
   a plurality of detection electrodes formed in the detection region and electrically insulated from one another;
   wiring electrodes formed in the wiring region and electrically connected to the plurality of the detection electrodes for transmitting a detection signal;
   a first shield electrode formed on an outer periphery of the front surface of the substrate for shielding the detection electrodes and the wiring electrodes against external noise;
   a first insulating layer formed on the wiring electrodes and the first shield electrode;
   a second shield electrode formed on an upper surface of the first insulating layer so as to cover the wiring region and the first shield electrode, the first insulating layer having a first through hole formed therein, and the second shield electrode being electrically connected to the first shield electrode via the first through hole; and
   a display panel provided on the rear surface of the substrate.

3. A touch panel comprising:
   a substrate having a first surface and a second surface opposite the first surface;
   a detection region disposed on the first surface of the substrate, the detection region having a plurality of detection electrodes electrically insulated from one another;
   a wiring region disposed on the first surface of the substrate, the wiring region having a plurality of wiring electrodes electrically connected to the plurality of the detection electrodes for transmitting a detection signal;
   a first shield electrode provided on the first surface of the substrate and surrounding the detection region and the wiring region for shielding the detection electrodes and the wiring electrodes against external noise;
   a first insulating layer formed on the wiring electrodes and the first shield electrode; and
   a second shield electrode formed on an upper surface of the first insulating layer so as to cover the wiring region and the first shield electrode;
   wherein the first insulating layer has a through hole formed therein, the second shield electrode being electrically connected to the first shield electrode via the through hole of the first insulating layer.

* * * * *